United States Patent
Brothers et al.

(10) Patent No.: US 10,387,770 B2
(45) Date of Patent: Aug. 20, 2019

(54) SPIKING NEURAL NETWORK WITH REDUCED MEMORY ACCESS AND REDUCED IN-NETWORK BANDWIDTH CONSUMPTION

(71) Applicant: Samsung Electronics Co., Ltd., Gyeonggi-Do (KR)

(72) Inventors: John W. Brothers, Calistoga, CA (US); Joohoon Lee, East Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 709 days.

(21) Appl. No.: 15/062,365

(22) Filed: Mar. 7, 2016

(65) Prior Publication Data
US 2016/0364644 A1    Dec. 15, 2016

Related U.S. Application Data

(60) Provisional application No. 62/173,742, filed on Jun. 10, 2015.

(51) Int. Cl.
*G06N 3/04*    (2006.01)

(52) U.S. Cl.
CPC .................................. *G06N 3/049* (2013.01)

(58) Field of Classification Search
CPC ..... G06N 3/049; G06N 3/082; G06F 17/3028
See application file for complete search history.

(56) References Cited

U.S. PATENT DOCUMENTS

| | | | |
|---|---|---|---|
| 5,532,950 A | 7/1996 | Moses et al. | |
| 7,054,850 B2 | 5/2006 | Matsugu | |
| 7,606,777 B2 | 10/2009 | Serre et al. | |
| 8,346,692 B2 | 1/2013 | Rouat et al. | |
| 8,971,614 B2 | 3/2015 | Mel et al. | |
| 9,020,870 B1 | 4/2015 | Daily et al. | |
| 9,390,369 B1* | 7/2016 | Sinyayskiy | G06N 3/049 |
| 2008/0152217 A1 | 6/2008 | Greer | |
| 2014/0012789 A1 | 1/2014 | Bazhenov et al. | |
| 2014/0258194 A1 | 9/2014 | Towal et al. | |
| 2014/0365414 A1 | 12/2014 | Richert et al. | |
| 2015/0100529 A1 | 4/2015 | Sarah et al. | |
| 2015/0120631 A1 | 4/2015 | Serrano Gotarredona et al. | |

(Continued)

OTHER PUBLICATIONS

European Search Report for Application No. 16 172 384.6, dated Feb. 23, 2017.

(Continued)

*Primary Examiner* — Vincent Gonzales
*Assistant Examiner* — Seth Andrew Raker
(74) *Attorney, Agent, or Firm* — Renaissance IP Law Group LLP

(57) ABSTRACT

A spiking neural network having a plurality layers partitioned into a plurality of frustums using a first partitioning may be implemented, where each frustum includes one tile of each partitioned layer of the spiking neural network. A first tile of a first layer of the spiking neural network may be read. Using a processor, a first tile of a second layer of the spiking neural network may be generated using the first tile of the first layer while storing intermediate data within an internal memory of the processor. The first tile of the first layer and the first tile of the second layer belong to a same frustum.

20 Claims, 7 Drawing Sheets

(56) References Cited

U.S. PATENT DOCUMENTS

2016/0239706 A1* 8/2016 Dijkman ............. G06F 17/3028
2017/0200078 A1* 7/2017 Bichler ................. G06N 3/063

OTHER PUBLICATIONS

Cao, Yongqiang et al., "Spiking Deep Convolutional Neural Networks for Energy-Efficient Object Recognition", International Journal of Computer Vision, vol. 113. No. 1, Nov. 23, 2014, pp. 54-66.
Krizhevsky, Alex et al., "ImageNet Classification with Deep Convolutional Neural Networks", The 26th annual conference on Neural Information Processing Systems (NIPS'25), Dec. 6, 2012, 9 pages.

* cited by examiner

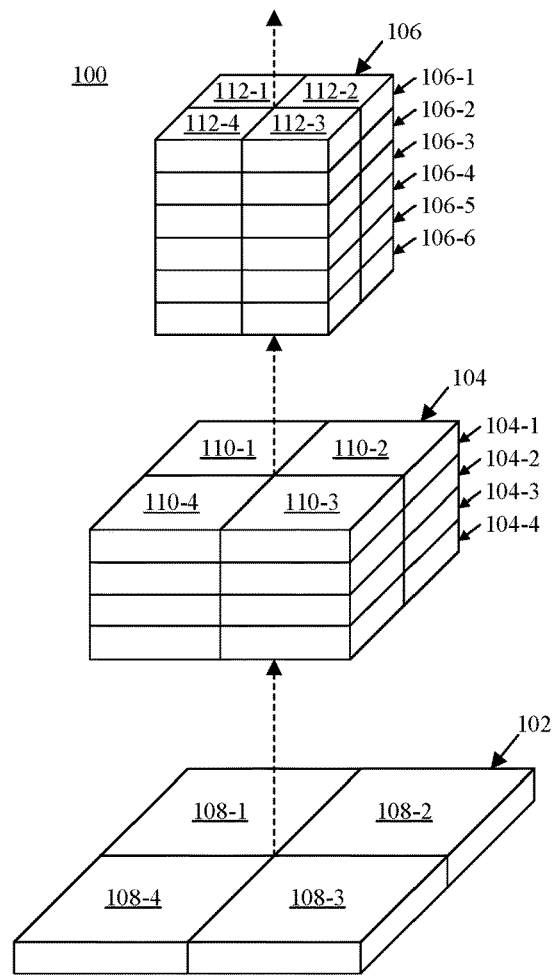
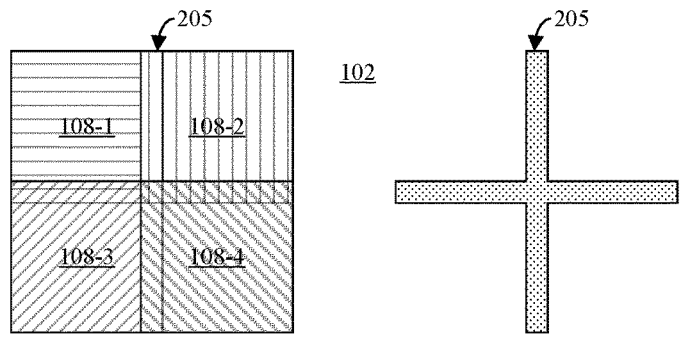
FIG. 1
FIG. 2

US 10,387,770 B2

SPIKING NEURAL NETWORK WITH REDUCED MEMORY ACCESS AND REDUCED IN-NETWORK BANDWIDTH CONSUMPTION

CROSS-REFERENCE TO RELATED APPLICATIONS

This application claims the benefit of U.S. Provisional Patent Application No. 62/173,742 filed on Jun. 10, 2015, which is fully incorporated herein by reference.

TECHNICAL FIELD

This disclosure relates to spiking neural networks. More particularly, the disclosure relates to reducing memory access and in-network bandwidth consumption of a spiking neural network during execution.

BACKGROUND

Neural networks may be used in a variety of different applications. For example, a neural network may be used to perform tasks including, but not limited to, speech recognition, visual objection recognition and/or localization, image reconstruction, anomaly detection, other applications where pattern recognition may be needed, and the like. Spiking neural networks are a particular class of neural networks suited for processing data with a time and/or sequential aspect. For example, spiking neural networks may be used to process audio such as speech and/or video.

Within a spiking neural network, "spikes" are transmitted between neurons. This characteristic of spiking neural networks may be leveraged to implement power-optimized neural networks. These power optimized neural networks may be implemented in a variety of different types of devices and/or systems including, but not limited to, consumer devices, servers, cloud server applications, and the like.

A Spiking Convolutional Neural Network (SCNN) and a Spiking Recurrent Neural Network (SRNN) belong to a particular subclass of spiking neural networks. SCNNs and SRNNs use the network topology and optimized training infrastructure of CNNs and RNNs. SCNNs and SRNNs, however, are converted to a spiking implementation for execution. The inputs provided to a spiking neural network consist of spike trains. More particularly, each input neuron receives a series of spikes as input. As noted, information is transmitted across the spiking neural network as spikes from one layer to the next. The final output is typically a train of output spikes. The output spikes may be counted or otherwise converted into the needed result, which may be a classification or other determination about the received input.

SUMMARY

One embodiment may include a method of implementing a spiking neural network having a plurality layers partitioned into a plurality of frustums using a first partitioning, wherein each frustum includes one tile of each partitioned layer of the spiking neural network. The method may include reading a first tile of a first layer of the spiking neural network and generating, using a processor, a first tile of a second layer of the spiking neural network using the first tile of the first layer while storing intermediate data within an internal memory of the processor. The first tile of the first layer and the first tile of the second layer belong to a same frustum.

Another embodiment may include an apparatus for implementing a spiking neural network having a plurality of layers partitioned into a plurality of frustums using a first partitioning, wherein each frustum includes one tile of each partitioned layer of the spiking neural network. The apparatus includes an internal memory configured to store intermediate data and a first compute unit coupled to the internal memory and configured to initiate executable operations. The executable operations include reading a first tile of a first layer of the spiking neural network and generating a first tile of a second layer of the spiking neural network using the first tile of the first layer while storing intermediate data within the internal memory. The first tile of the first layer and the first tile of the second layer belong to a same frustum.

Another embodiment may include a computer program product including a computer readable storage medium having program code stored thereon to implement a spiking neural network having a plurality of layers partitioned into a plurality of frustums using a first partitioning, wherein each frustum includes one tile of each partitioned layer of the spiking neural network. The program code is executable by the processor to perform operations including reading a first tile of a first layer of the spiking neural network and generating, using a processor, a first tile of a second layer of the spiking neural network using the first tile of the first layer while storing intermediate data within an internal memory of the processor. The first tile of the first layer and the first tile of the second layer belong to a same frustum.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIG. 1 is a block diagram illustrating exemplary processing of a plurality of layers of a spiking neural network.

FIG. 2 is a block diagram illustrating an exemplary partitioning of a layer of a neural network with overlapping tiles.

DETAILED DESCRIPTION

Figure 3:
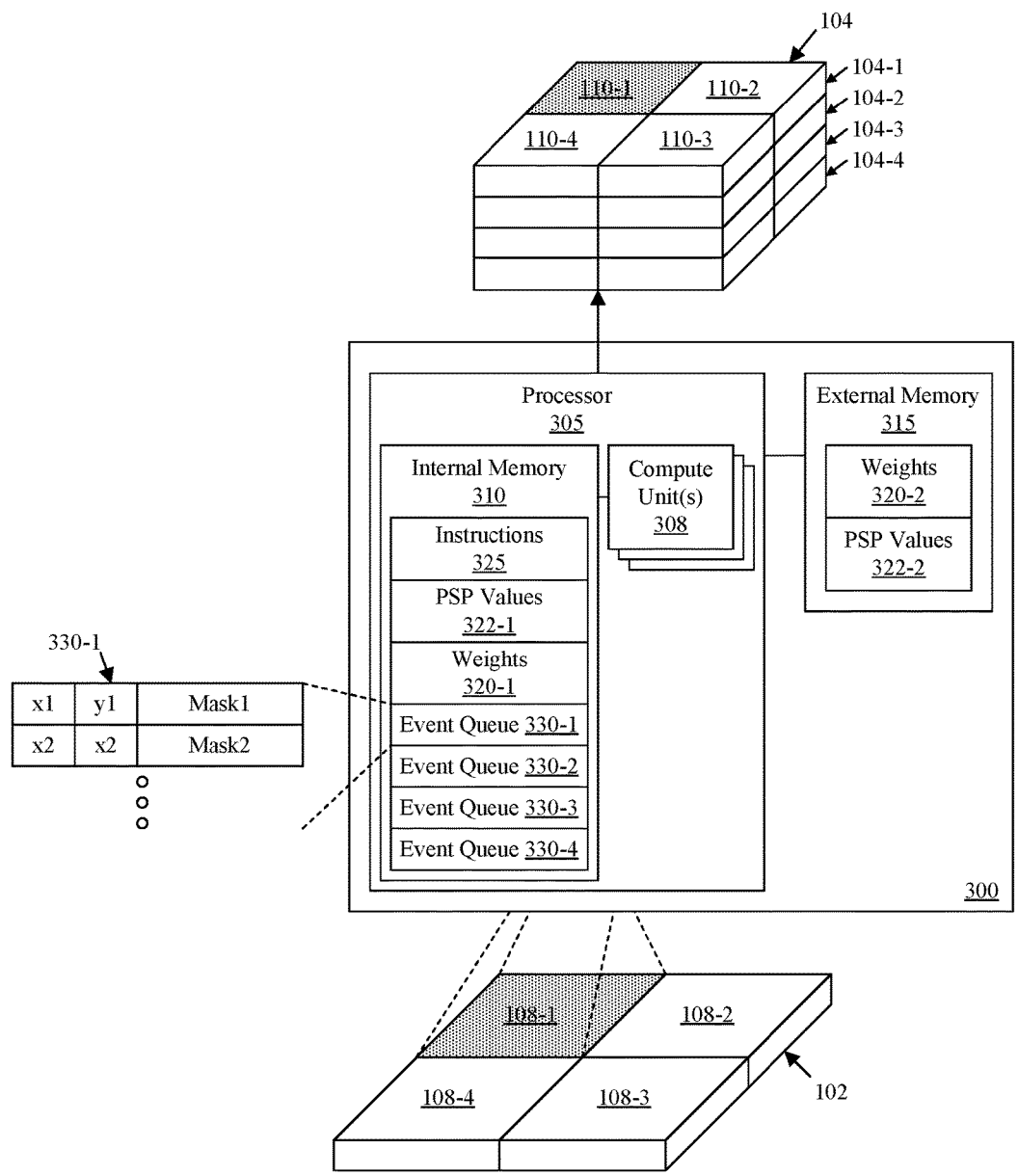
FIG. 3 is a block diagram illustrating processing performed by an exemplary neural network engine.

While the disclosure concludes with claims defining novel features, it is believed that the various features described herein will be better understood from a consideration of the description in conjunction with the drawings. The process(es), machine(s), manufacture(s), and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to spiking neural networks (SNNs). More particularly, the disclosure relates to reducing memory access and in-network bandwidth consumption of an SNN during execution. SNNs may be used to implement power-optimized neural networks that may be used in a variety of different types of systems ranging from mobile consumer devices to servers that may be used to execute cloud server applications.

SNNs utilize a particular neuron model that suppresses activity in portions of the SNN, thereby allowing the SNN to consume less power than other types of neural networks. Activity may be suppressed by using a thresholding model for neurons in the SNN. Unless a feature is sufficiently strong in a given region, the response in the SNN is zero (0) or no spikes being generated. The power expended in that portion of the neural network becomes negligible.

A number of different types of SNNs store a post synaptic potential (PSP) value at each neuron. The PSP values for the neurons within the SNN represent the state of the SNN at a given time. The computational cost to update a PSP for a neuron may be small since the incoming data is a 0 (indicating no spike) or a 1 (indicating a spike). Determining a weighted sum of the inputs to determine the PSP value of a neuron involves conditional addition operations as opposed to multiplication operations. Multiply operations are eliminated. Still, some SNNs store a large amount of data, which includes the PSP values. Storing this data in order to execute the SNN may require significant memory and generate significant read and write data traffic in order to save and restore the state of the SNN after each time interval that is processed.

In accordance with the inventive arrangements described herein, an SNN may be executed by a neural network engine (NN engine) in a manner that may reduce or eliminate data traffic for storing and restoring the SNN state. As data traffic relating to storing and retrieving PSP values from an external memory is reduced or eliminated, storage of the SNN state within external memory may also be reduced or, at least in some cases, eliminated. In another aspect, the SNN may be executed so that spikes may be generated to reduce and/or eliminate the adding of zeroes when computing the weighted sum of inputs to each neuron.

The reduction of data traffic, as described herein, translates into reduced power consumption by the NN engine when executing the SNN. The performance of the NN engine may also be increased, e.g., made to run or execute faster. The improvements in performance, whether for power consumption or execution time, allow systems that have constrained power and/or thermal budgets to implement SNNs as described herein. In larger server-based computing environments, power consumption is still a significant cost and limitation that may inhibit the scaling up of an application that utilizes a neural network. The inventive arrangements described within this disclosure facilitate usage and scaling of SNN implementations within server-based computing environments including, but not limited to, cloud computing environments.

FIG. 1 is a block diagram illustrating exemplary processing of a plurality of layers of an SNN 100. In the example of FIG. 1, SNN 100 includes layers 102, 104, and 106. Layer 102 is a first layer. Layer 104 is a second layer. Layer 106 is a third layer. In the example of FIG. 1, data flows up from layer 102, to layer 104, and to layer 106. As an example, layers 102, 104, and 106 each may be implemented as a convolution layer of a feature extraction neural network.

As defined herein, a "layer" of a neural network includes one or more feature maps. As pictured, each of layers 102, 104, and 106 may include one or more feature maps. In the example of FIG. 1, layer 102 includes one feature map 102-1. Layer 104 includes four feature maps 104-1, 104-2, 104-3, and 104-4. Layer 106 includes six feature maps 106-1, 106-2, 106-3, 106-4, 106-5, and 106-6. It should be appreciated that the number of feature maps shown in each of layers 102, 104, and 106 is for purposes of illustration. The inventive arrangements described within this disclosure are not intended to be limited by the particular number of feature maps in any of the layers of SNN 100 and/or by the particular number of layers in SNN 100.

In one arrangement, an NN engine may execute SNN 100 illustrated in FIG. 1. During operation, the NN engine generates intermediate data traffic by reading and writing the feature maps of layers 102, 104, and 106. The NN engine may perform multiple read operations of the feature maps in executing SNN 100. For purposes of illustration, since each of layers 102, 104, and 106 may include 10s, 100s, or more feature maps, a significant amount of intermediate data traffic may be generated in and/or between layers during execution of SNN 100.

In one aspect, each of the feature maps may be implemented as a 2D image map of PSP values representing the strength of a learned feature at different (x, y) locations. In order to generate a feature map in layer N+1 of SNN 100, the NN engine reads a number of feature maps in layer N. As an illustrative example, if layer N has 10 feature maps and layer N+1 has 20 feature maps, the NN engine may read each feature map in layer N 20 times. As such, the NN engine may perform a total of 200 feature map reads (10×20) from layer N alone.

In accordance with one aspect of the inventive arrangements described herein, the NN engine may reorder computations in implementing SNN 100. Reordering computations allows the NN engine to consume intermediate values produced during execution of SNN 100 soon after the intermediate values are generated. By using the intermediate values shortly after generation, the amount of intermediate data that must be stored in an external memory such as a random access memory (RAM) at any one time within the NN engine may be limited. For example, the amount of intermediate data requiring storage during execution of SNN 100 may be small enough to fit within an internal memory of a processor of the NN engine. The internal memory may be an on-die memory or cache of the processor of the NN engine. As such, the intermediate data need not be stored in external RAM or other memory that requires more time and/or energy to read and write.

In one exemplary embodiment, the NN engine may use a same set of conditional accumulate units to generate the intermediate data for a layer and to consume the intermediate data as input for a next layer of the neural network. As noted, the intermediate data may be consumed by the accumulate units shortly after generation by the same accumulate units. Accordingly, little, if any, of the intermediate data may need to be sent any significant distance within the NN engine, e.g., to external RAM. Such a configuration may help to further reduce power consumption of the NN engine by reducing the data traffic on long interconnects within the NN engine.

In another exemplary embodiment, the NN engine may be configured to reorder computations to reduce and/or eliminate and localize the intermediate results by interleaving the generation of one or more or potentially all of the convolution layers of the neural network. In a conventional implementation, an NN engine may execute all of layer 102, then all of layer 104, then all of layer 106, and so forth. In accordance with the inventive arrangements described herein, the NN engine may execute a portion of layer 102, then a portion of layer 104, and then a portion of layer 106, and so on. For example, the NN engine may execute tile 108-1 in layer 102, followed by tile 110-1 of layer 104, followed by tile 112-1 of layer 106, etc. The NN engine may then execute tile 108-2, followed by tile 110-2, followed by tile 112-2, and so on. In still another arrangement, input data may be batched over two or more time intervals.

For purposes of illustration, SNN 100 of FIG. 1 may be visualized as a pyramid of layers. As noted, execution may start at the bottom of the pyramid in layer 102 having tiles 108, and continue upward to layer 104 having tiles 110, and to layer 106 having tiles 112. As SNN 100 is traversed upwards, each next higher layer may shrink in terms of x-y dimensions while the number of feature maps for the layer increases. The x-y dimensions of layer 104, for example, may be smaller than the x-y dimensions of layer 102. Layer 104 has more feature maps than layer 102. In other cases, the number of feature maps in a next higher layer of an SNN may remain the same.

In accordance with another embodiment, the 3D volume of SNN 100 may be conceptually diced up, or partitioned, into a plurality of rectangular frustums. Each rectangular frustum may have a rectangular intersection, defining a tile, with each layer of SNN 100. In the example of FIG. 1, SNN 100 is divided into four frustums referred to as frustums 1, 2, 3, and 4. The rectangular tiles are defined by the intersection of the frustums with each of layers 102, 104, and 106 of SNN 100. Accordingly, each tile of a given layer includes a portion of each feature map of that layer. For example, tile 110-1 includes the top-left portion of each of feature maps 104-1, 104-2, 104-3, and 104-4. For purposes of discussion, the extended portion of the reference number of each tile of a layer indicates the particular frustum to which the tile belongs. For example, frustum 1 may include tile 108-1 of layer 102, tile 110-1 of layer 104, and tile 112-1 of layer 106. Frustum 2 may include tile 108-2 of layer 102, tile 110-2 of layer 104, and tile 112-2 of layer 106, etc.

In general, the processing within each frustum may be performed independently of each other frustum. In one embodiment, a small amount of data may be shared between adjacent frustums. For a tile of a given layer of SNN 100, the portions of the feature maps consumed by, and generated by, the processor of the NN engine may be stored in an internal memory that is on-die with the processor. The portions of the feature maps generated by the processor for a tile are used to generate output for the corresponding tile of the next layer. For example, the processor may consume portions of feature maps, e.g., tile 108-1 of layer 102, stored in internal memory to generate corresponding tile 110-1 of layer 104. Tile 110-1 of layer 104 may also be stored in the internal memory. As defined within this disclosure, the term "corresponding tile" refers to a tile in a same frustum and in an adjacent layer of a neural network as a reference or subject tile. The processor may then utilize tile 110-1 of layer 104 in internal memory to generate tile 112-1 of layer 106. Tile 112-1 may also be stored in internal memory. In one aspect, the total storage required for the internal memory to process a frustum is the maximum footprint (e.g., memory usage) of corresponding tiles of the frustum in two adjacent layers of SNN 100. For example, data corresponding to tile 112-1 may overwrite data for tile 108-1. It should be appreciated that the x and y dimensions of the tiles, e.g., frustum size, may be reduced as needed to guarantee that the intermediate results fit in the available internal memory.

For each frustum of the neural network, the NN engine may generate portions of the feature maps defined by a tile for layer N+1 from the portions of the feature maps defined by the corresponding tile of layer N. In one embodiment, the NN engine may perform the necessary processing in any of a variety of different orders while maintaining all needed data in the internal memory. For example, the NN engine may generate portions of each output feature map for a tile by reading and weighting each of the input spikes of the portions of the feature maps defined by the corresponding tile of layer N. The NN engine may add the weighted spikes together to generate spikes (or not) for the portions of feature maps defined by the corresponding tile in layer N+1. After the NN engine generates the portions of feature maps of layer N+1, the storage area of the internal memory allocated to feature map data of layer N may be freed and used to store the feature map data for layer N+2. The NN engine may continue to overwrite the intermediate data for a layer as newly generated intermediate data of next layers is generated as described.

While frustums may be processed independently, a small portion of the intermediate data may be shared along boundaries of adjacent tiles within same layers of the neural network. As noted, spikes generated by tile 108-1 of layer 102 propagate to tile 110-1 of layer 104. In this example, a small portion of the spikes generated for tile 108-1 of layer 102 may need to be shared with tile 108-2 of layer 102. In an embodiment where each frustum is associated with one event queue, the spike events for adjacent tiles may be posted in two or more event queues targeting the affected tiles. In another embodiment, the spike events of adjacent tiles may be posted to one event queue and read multiple times. Posting spike events of adjacent tiles to more than one event queue or reading spike events of adjacent tiles multiple times effectively shares data between tiles. In another embodiment, data sharing between adjacent tiles may be eliminated by defining the tiles to overlap one another at tile boundaries. In that case, the NN engine may determine spike events for tiles, including the boundary regions of the tiles, one time per tile. Accordingly, in the case of overlapping tiles, data for two adjacent tiles need not be shared.

By dividing the neural network into frustums that may be handled independently of one another, the NN engine may process frustums in parallel using a plurality of compute units. For example, one compute unit of the NN engine may execute tiles 108-1, 110-1, and 112-1; another compute unit of the NN engine may execute tiles 108-2, 110-2, and 112-2; another compute unit of the NN engine may execute tiles 108-3, 110-3, and 112-3, while still another compute unit of the NN engine may execute tiles 108-4, 110-4, and 112-4. As noted, some data may be used or shared among tiles of immediately adjacent frustums that are in a same layer.

FIG. 2 is a block diagram illustrating an exemplary partitioning of a layer of a neural network with overlapping tiles. More particularly, FIG. 2 illustrates layer 102 of SNN 100. As pictured, tiles 108-1, 108-2, 108-3, and 108-4 are defined to overlap with one another. The overlap region 205 is shaded. Overlap region 205 is also shown in isolation without tiles 108-1, 108-2, 108-3, and 108-4.

FIG. 3 is a block diagram illustrating processing performed by an exemplary NN engine 300. As pictured, NN engine 300 may include a processor 305 and an external memory 315. Processor 305 may include one or more compute units 308. In the case where processor 305 includes more than one compute unit 308, compute units 308 may be configured to operate in parallel or concurrently with one another. Further, compute units 308 may operate independently of one another. In one example, each compute unit 308 may be implemented as a core that may execute instructions.

Processor 305 may include an internal memory 310. Internal memory 310 may be an on-die memory. For example, internal memory 310 may be a cache memory of processor 305. Internal memory 310 may be implemented as a simple buffer, a level 1 cache memory, a level 2 cache memory, or the like of processor 305. As pictured, compute units 308 may be coupled to internal memory 310. In an arrangement where processor 305 includes a plurality of compute units 308, each compute unit 308 may have a dedicated internal memory 310. Internal memory 310, or each internal memory as the case may be, may store PSP values 322-1 (e.g., feature maps and/or portions thereof), optionally store weights 320-1, instructions 325, and include one or more event queues 330.

As pictured, processor 305 may be coupled to external memory 315. In one example, external memory 315 may be implemented as one or more further levels of cache memory for processor 305. External memory 315, however, may not be located on a same die as processor 305. In another example, external memory 315 may be implemented as a RAM, e.g., a DRAM, an SRAM, or the like. In another aspect, processor 305 may be coupled to external memory 315 through a memory controller (not shown). In general, intermediate data, e.g., PSP values 322-1, weights 320-1, and spike events may be stored within internal memory 310. The spike events may be stored within event queues 330. As defined herein, the term "spike event" refers to the output of a neuron as being either a 1 (indicating a spike) or a 0 (indicating no spike).

In the example of FIG. 3, weights 320-2 for neurons of the neural network may be stored in external memory 315, while weights 320-1 may be stored in internal memory 310. In one exemplary implementation, weights 320-1 are those weights needed for processing a tile of a layer of SNN 100 to generate the corresponding tile for the next layer of SNN 100. In the example of FIG. 2, for example, weights 320-1 are the weights needed to process tile 108-1 of layer 102 to generate tile 110-1 of layer 104. Weights 320-2 are the other weights of SNN 100 not currently in use. In another exemplary embodiment, processor 305 may compress weights 320-1 for storage in internal memory 310.

Processor 305 may be implemented as one or more hardware circuits. In one aspect, processor 305 may be configured to carry out instructions such as instructions 325. Instructions 325 may be contained in program code. As noted, processor 305 may be implemented as an integrated circuit. Exemplary implementations of processor 305 may include, but are not limited to, a central processing unit (CPU), a multi-core CPU, an array processor, a vector processor, a digital signal processor (DSP), a field-programmable gate array (FPGA), a programmable logic array (PLA), an application specific integrated circuit (ASIC), programmable logic circuitry, a controller, or the like. NN engine 300 may be implemented using any of a variety of different processors as described in combination with external memory 315.

NN engine 300 may operate on individual tiles of SNN 100 as opposed to individual neurons. Since the receptive areas of the convolution filters overlap, a single input spike may contribute to multiple adjacent target neurons. As an illustrative example, consider a receptive field of 5×5 target neurons. In that case, an input spike contributes to 25 target neurons. A consequence of transmitting spikes between layers of the neural network is that convolutions in an SCNN degenerate from an N×M matrix-matrix multiply to N×M conditional additions. In the N×M conditional additions, particular ones of weights 320-1 that correspond to inputs with spikes are added.

In one exemplary embodiment, NN engine 300 may reduce and/or eliminate unnecessary add zero (add-0) operations from the accumulation step. For example, processor 305 may iterate over input spikes rather than output neurons. Processor 305 may update each affected target neuron. Processor 305 may perform the updating in parallel. In consequence, processor 305 may "scatter" the input as opposed to "gather" the input.

As pictured, NN engine 300 may store input spikes in a plurality, e.g., an array, of event queues 330. In one arrangement, each event queue 330 may be reserved for use by a particular frustum of the neural network. For example, NN engine 300 may include one event queue for each frustum of the neural network. As such, each event queue may store spike events targeting a given width (W) by height (H) by depth (D) of the neural network for a given set of "T" time intervals, where T is an integer value of one or more.

In the example of FIG. 3, internal memory 310 may be used to implement event queues 330, which are labeled as event queues 330-1, 330-2, 330-3, and 330-4. The particular frustum for which each event queue may be used is indicated by the extended portion of the reference number for event queues 330. As such, event queue 330-1 may be used for frustum 1. Event queue 330-2 may be used for frustum 2, etc. In one exemplary embodiment, NN engine 300 may maintain a one-to-one relationship between frustums and event queues. Maintaining this relationship results in spike events for tiles in the same frustum from different layers being stored in the same event queue.

For purposes of illustration, event queues 330-1, 330-2, 330-3, and 330-4 are shown as being implemented concurrently within internal memory 310. It should be appreciated that only event queues for the particular frustums being processed need be implemented within internal memory 310 at any given time. For example, if NN engine 300 is processing tiles for frustum 1, then NN engine 300 need only implement event queue 330-1 within internal memory 310. Other event queues may be implemented for storing spike events as NN engine 300 processes such other frustums.

As an illustrative example, event queue 330-1 may store spike events generated from processing tile 108-1. The spike events are transitory and, as such, may be overwritten within event queue 330-1 once consumed or used by neuron(s) using weights 320-1 to update PSP values 322-1 of neurons. PSP values 322-1 and 322-2, which form the feature maps, represent a persistent state of SNN 100. Processor 305 updates PSP values 322-1 each time interval. Accordingly, PSP values 322-1, representing portions of feature maps for a tile, are not deleted and/or moved from internal memory 310 until a selected number of time intervals have been processed to generate the corresponding tile in the next layer. For example, PSP values 322-1 within internal memory 310 may represent PSP values for T time intervals of tile 108-1 and the PSP values for T time intervals of tile 110-1 generated from tile 108-1. Responsive to generating the T time intervals for tile 110-1, the PSP values of tile 108-1 stored within internal memory may be stored in, or moved to, external memory 315 as PSP values 322-2. PSP values may be subsequently recalled from external memory 315 and stored in internal memory 310 to process further time intervals for tile 108-1 and generate further time intervals for tile 110-1.

In one embodiment, spike events for a given tile of a layer may be represented by entries in event queues 330. A queue entry may include an (x, y) coordinate within the tile followed by a mask specifying ones and/or zeroes. For example, the coordinate (x, y) represents an offset for a location of a first portion of a tile. The mask following the coordinate may include a number of bits indicating whether particular nodes of a tile have a spike or have no spike. In one example, a one (1) value in the mask may indicate a spike while a zero (0) value may indicate no spike. In this embodiment, an (x, y) coordinate need not be saved for each neuron, thereby providing compact and/or compressed storage. Depending upon the sparsity of the spikes, other event queue storage formats may be used to efficiently specify which neurons have spiked and the time interval of the spike.

As pictured, event queue 330-1 may include a plurality of entries as rows. Each row may represent the spikes of a region of a given tile. For example, the pair (x1, y1) represents the offset of a location of a first region of a tile from the reference point for the tile. The mask, e.g., Mask1, may include a number of bits indicating whether particular neurons of the tile have a spike or have no spike. For example, if the region is a 5×5 block, then Mask1 may have 25 bits if the states are "spike" and "no spike." The regions of feature maps generated using tile 108-1 may be stored in event queue 330-1 as (x1, y1) followed by Mask1, as (x2, y2) followed by Mask2, etc.

In still another embodiment, processor 305 may be configured to further compress the spike event data to reduce storage and/or to simplify processing of the compressed entries. In one example, processor 305 may skip processing of regions or and/or sub-regions with no spikes. In another example, regions or sub-regions that correspond to all zeroes (e.g., no spikes) as specified in a queue entry may be filtered to reduce unnecessary computational costs. For example, NN engine 300 may include logic that prevents regions of all zeroes from being stored in event queues 330 within internal memory 310.

It should be appreciated that in cases where a region or sub-region has all zeroes, e.g., no spikes, NN engine 300 may track the number of timing intervals over which a given region has no spikes and update PSP values 322-1 to indicate the decay that takes place based upon the number of elapsed time intervals without spikes for the region. As such, PSP values 322-1 need not be updated each time interval for those regions that have no spikes for one or more timing intervals.

Figure 4:
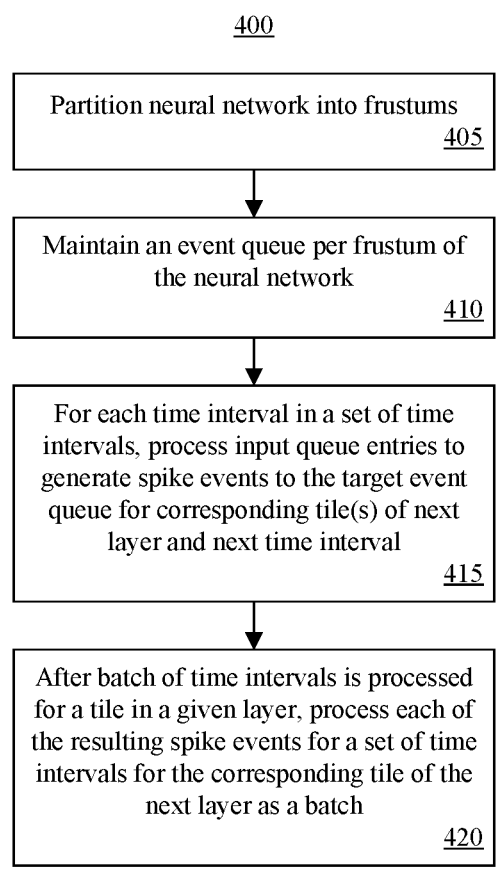
FIG. 4 is a flow chart illustrating an exemplary method of executing a spiking neural network.

FIG. 4 is a flow chart illustrating an exemplary method 400 of executing an SNN. Method 400 may be performed by an NN engine as described with reference to FIG. 3. In block 405, the NN engine may partition the neural network into a plurality of frustums. The frustums may be rectangular. The NN engine may divide the neural network into rectangular frustums projecting from the higher layers of the neural network to the lower layers.

In one embodiment, the NN engine may use a predetermined partitioning of the SNN. For example, the SNN may be stored with a predetermined partitioning that the NN engine may read and/or determine upon executing the SNN.

In another embodiment, the NN engine may partition the neural network responsive to execution of the neural network. For example, the NN engine may partition the SNN according to a size of an internal memory for the processor of the neural network. The NN engine may size the frustums according to an amount of memory internally available to the processor for implementing event queues, storing weights, storing instructions, and storing PSP values for processing corresponding tiles from two adjacent layers of the SNN as described.

In block 410, the NN engine may create and/or maintain an event queue per frustum of the neural network. As spikes are generated for a tile of a layer, spike events are posted to the event queue for the corresponding tile of the next layer. These are input spikes to that layer for the next time interval. It should be appreciated that the spike events of two different layers and/or time intervals may be logically differentiated and/or separated within a same event queue. The NN engine may cluster spikes in time intervals and according to tiles of the layer(s) of the neural network. The clustering, as implemented using the event queues, allows the NN engine to represent the collection of spike events more compactly since a plurality of spike/no spike values may be stored in a mask with a single (x, y) offset as opposed to storing an (x, y) offset for each bit (spike/no spike value) of the mask.

In block 415, for each time interval in a set of time intervals T, the NN engine may process each input queue entry to generate all spike events to the appropriate target event queue of the corresponding tile of the next layer in the neural network. For instance, the NN engine may read the next queue entry for the frustum being processed. The NN engine may compute which target neurons are affected according to the width and height of the receptive field and the bits set in the mask of the queue entry. As noted, the bits of the mask in the queue entry specify which of the neurons in the prior layer have generated spikes.

In an illustrative example, the NN engine may process groups of 4 spikes. It should be appreciated that 4 is chosen for explanatory purposes only and is not intended as a limitation of the inventive arrangements described herein. For example, the NN engine may process groups with fewer or more than 4 spikes. In one example, the NN engine may process partial groups when the number of spikes is not a whole multiple of 4. Continuing with the example, for each 4-input accumulator, the NN engine may route the corresponding weights from internal memory for the 4 input spikes that contribute to the corresponding output neuron. In one arrangement, the NN engine may utilize look up tables to generate the correct weights depending on the relative (x, y) offset of the spikes provided to each accumulator as input.

When the contributions from spikes from all input feature maps have been accumulated at a given accumulator corresponding to a given target neuron, the NN engine may compute the PSP value for the neuron. If the new PSP value exceeds a threshold, the NN engine generates a new spike. Accordingly, the NN engine may add a corresponding queue entry to the output event queue. The PSP value is updated for computations in subsequent time intervals. As such, a PSP value must be stored at each neuron. The PSP values for all of the neurons represents the state of the neural network at any given time interval. The PSP values may constitute a large amount of data requiring memory storage and read and write data traffic to save and restore the neural network state after each time interval.

Since an SCNN is a feed-forward type of neural network, the NN engine may process a tile of the first layer for some number T, where T is an integer value of 1 or more, time intervals and build up a plurality of time intervals for the corresponding tile of the next layer of the neural network. In one arrangement, the spikes for a plurality of time intervals may be batched together through one layer of the neural network to produce events from that layer for multiple time intervals. The neuron states, e.g., PSP values, may be saved to external memory and recalled from the external memory between batches of time intervals. Saving and recalling the neuron states may be a source of data traffic particularly in larger neural networks. Further, by batching time intervals into groups of T time intervals, the data traffic generated by weights and the weight decompression processing time is reduced. This reduction occurs since the same weights may be used repeatedly for the entire batch of T time intervals and remain in the internal memory during that time before new weights are read from external memory to process the tile in the next layer.

As the NN engine batches T time intervals together through each layer, the data traffic from saving and recalling neuron states may be reduced by a factor of 1/T. By batching, the NN engine may keep the PSP values in the internal memory and inhibit a portion of the data traffic, e.g., some or all, associated with storing and recalling the neuron states. In one embodiment, all intervals required to produce a result for the neural network may be batch processed together for each layer before doing anything for a subsequent or higher layer. In that case, data traffic relating to storing neuron state may be eliminated. Further, the external memory may be eliminated from the NN engine.

The NN engine may also spread work across multiple processing cores to achieve good scaling with minimal, or less, cross traffic for the exchange of spikes between adjacent tiles. As discussed, the NN engine may maintain event queues that are used to propagate spikes from one layer of the neural network to a next layer. The spikes require storage. The process of generating spikes may be managed so that each queue entry may be stored within the internal memory, e.g., within the on-die memory, of the compute unit and/or processor of the NN engine. Maintaining queue entries within the internal memory may be accomplished by processing each layer in tiles where the number of events has a known maximum storage requirement. Accordingly, the NN engine does not need to produce all spike events for an entire layer at once before processing is done in the next layer.

In block 420, the NN engine may process the resulting spike event data for the set of T time intervals for the corresponding tile of the next layer as a batch.

Though not illustrated in FIG. 4, it should be appreciated that the NN engine may repeat the operations described with reference to blocks 415 and 420 up the stack of layers within the frustums of the neural network. Further, for a given batch of time intervals, the NN engine may scan one or more contiguous tiles of the layer to produce a multiple "N" number of spike events where "N" is the number of cores in the NN engine. For example, if the NN engine produces "S" number of spike events, and includes "N" cores, the NN engine may produce N×S spike events for a given layer prior to moving to the next higher layer in the neural network.

Figure 5:
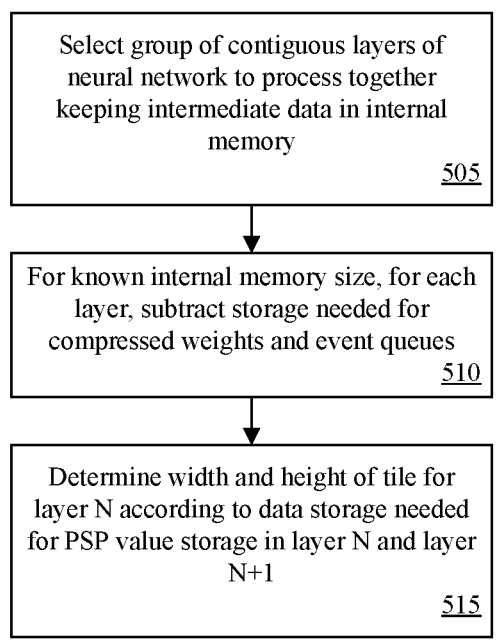
FIG. 5 is a flow chart illustrating an exemplary method of determining frustums for a neural network.

FIG. 5 is a flow chart illustrating an exemplary method 500 of determining frustums for a neural network. Method 500 may be performed to partition the neural network into frustums, which define the size of the tiles in each respective layer of the neural network. In one embodiment, method 500 may be implemented by a data processing system (system) such as a computer. The system may be configured to operate on a description of the neural network that is to be partitioned into frustums. For example, the system may be configured, e.g., programmed, to perform the operations described with reference to FIG. 5. In one embodiment, method 500 may be performed as an offline process in that method 500 may be performed prior to execution of the neural network. The partitioning determined may be stored as part of the neural network for later execution.

In block 505, the system may select a group of contiguous layers of the neural network to process together keeping intermediate data in an internal memory of the processor of the NN engine. As discussed, keeping intermediate data in an internal memory of the processor of the NN engine reduces the off-chip data traffic generated in executing the neural network.

In block 510, the system may subtract the storage needed for storing compressed weights and event queues for each layer in the group from the known internal memory size. The amount memory required to store compressed weights for each layer of the neural network is known from the training process performed prior to partitioning. The size of the event queues may be set or determined using a heuristic for the neural network that allows spike event data to fit within the queue. The remaining storage is available for storing PSP values in each layer.

In block 515, the system may determine the width and the height of the tiles based upon the storage required for the number of feature maps in layer N of the group plus the corresponding storage requirement for the next layer (layer N+1) of the group. The storage required for layer N+1 is the product of the scaled width and height and the number of feature maps in layer N+1. The width and height are scaled from layer N.

For the group of layers selected in block 505, the system may determine the width and height at any given layer so the PSP values for the tile of two adjacent layers (e.g., corresponding tiles) fit in the remaining storage after the compressed weights and event queue storage are subtracted from the total available storage of the internal memory. Since tile resolution is scaled at each layer, one size would result that would not scale beyond the available storage.

FIG. 5 is presented for purposes of illustration only and, as such, is not intended as a limitation of the inventive arrangements disclosed herein. FIG. 5 illustrates an exemplary process for partitioning a neural network into frustums based upon the size of the internal memory of the NN engine. In one arrangement, FIG. 5 may be performed for different groups of contiguous layers in the SNN to determine more than one partitioning of the SNN. In this manner, a portion of the SNN with a plurality of contiguous layers may be executed using a first partitioning and a second (or third or more) portion of the SNN having contiguous layers may be executed using a second and different partitioning.

Figure 6:
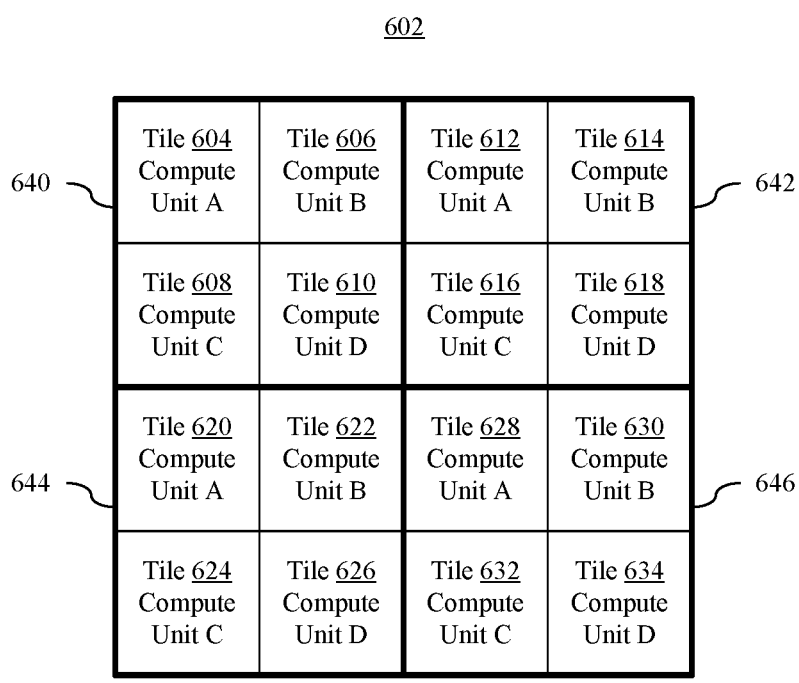
FIG. 6 is an exemplary partitioning of a layer of a spiking neural network.

FIG. 6 is an exemplary partitioning of a layer 602 of an SNN. In the example of FIG. 6, layer 602 is partitioned to include 16 tiles shown as tiles 604-634. In the example shown in FIG. 6, the NN engine may include a plurality of different compute units or cores. For example, the NN engine may include 4 compute units A, B, C, and D. Accordingly, the NN engine may spread work across compute units A, B, C, and D to achieve good scaling with minimal, or at least less, cross traffic for the exchange of spike events between adjacent tiles.

In one example, the NN engine may execute section 640 of layer 602 first. Section 640 includes tiles 604, 606, 608, and 610. The NN engine may generate all spike events for the tiles of section 640 for a batch of T time intervals as input to a next layer of the neural network. Compute unit A may execute tile 604. Compute unit B may execute tile 606. Compute unit C may execute tile 608. Compute unit D may execute tile 610.

The NN engine may execute section 642 of layer 602 second. Section 642 includes tiles 612, 614, 616, and 618. The NN engine may generate all spike events for the tiles of section 642 for the batch of T time intervals as input to the next layer of the neural network. Compute unit A may execute tile 612. Compute unit B may execute tile 614. Compute unit C may execute tile 616. Compute unit D may execute tile 618.

The NN engine may then proceed to the next layer of the neural network and execute the corresponding tiles in the next layer. The NN engine may continue up through the layers of the neural network until a selected or designated layer is reached. Responsive to reaching the selected layer, the NN engine may return to layer 602 to continue processing the remaining tiles.

For example, after returning to layer 602 as described, the NN engine may execute section 644 of layer 602 first. Section 644 includes tiles 620, 622, 624, and 626. The NN engine may generate all spike events for the tiles of section 644 for the batch of T time intervals as input to the next layer of the neural network. Compute unit A may execute tile 620. Compute unit B may execute tile 622. Compute unit C may execute tile 624. Compute unit D may execute tile 626.

The NN engine may execute section 646 of layer 602 second. Section 646 includes tiles 628, 630, 632, and 634. The NN engine may generate all spike events for the tiles of section 646 for the batch of T time intervals as input to the next layer of the neural network. Compute unit A may execute tile 628. Compute unit B may execute tile 630. Compute unit C may execute tile 632. Compute unit D may execute tile 634. The NN engine may continue up through the layers of the neural network, as described, processing corresponding tiles until the selected layer is reached.

Figure 7:
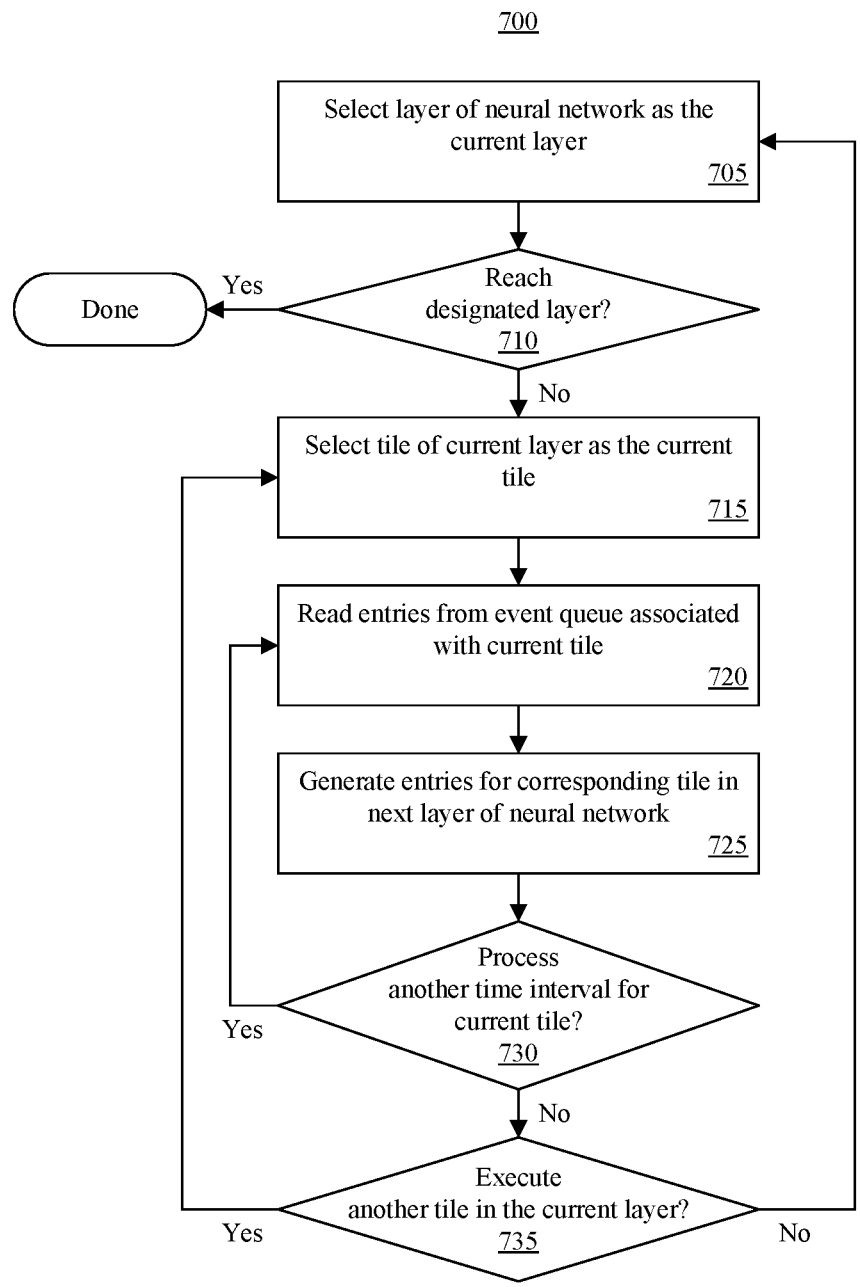
FIG. 7 is a flow chart illustrating another exemplary method of executing a spiking neural network.

FIG. 7 is a flow chart illustrating another exemplary method 700 of executing an SNN. Method 700 may be performed by an NN engine as described with reference to FIG. 3. Method 700 may begin in a state where the NN engine has already partitioned the neural network into frustums and established queues for the frustums as described herein.

In block 705, the NN engine may select a layer of the neural network as the current layer. For example, the NN engine may select layer N as the current layer. In block 710, the NN engine may determine whether the current layer is one designated as a stopping point for performing the execution method illustrated in FIG. 7. If so, in one aspect, method 700 may end. In another aspect, as described with reference to FIG. 6, the method may start anew at a first layer of the neural network. For example, the NN engine, in block 710, may determine that a particular layer of the neural network has been reached. In response, NN engine may start processing from a beginning layer if further tiles remain to be processed in the beginning layer (e.g., at least one other frustum of the neural network requires processing) or end. If a designated layer is not reached, method 700 may continue to block 715.

In block 715, the NN engine may select a tile of the current layer as the current tile. In block 720, the NN engine may read queue entries from the event queue associated with the current tile. The queue entries may also be for a first time interval to be processed.

In block 725, the NN engine may generate queue entries for the corresponding tile in a next layer of the neural network using the weights and PSP values. For example, if the current tile being processed is tile 108-1 of layer 102 in FIG. 1, the corresponding tile in the next layer is tile 110-1 of layer 104. The queue entries generated for the next layer of the neural network may be stored in the same event queue. As noted, the NN engine may designate the generated queue entries as belonging to the next layer as opposed to belonging to the current layer. The NN engine further may group the queue entries according to time interval.

As discussed, when the contributions from spikes from all input feature maps have been accumulated at a given accumulator corresponding to a given target neuron, the NN engine may compute the PSP value for the neuron. If the new PSP value exceeds a threshold, the NN engine generates a new spike. Accordingly, the NN engine may add a corresponding queue entry to the output event queue. The PSP value of the neuron is updated for computations in subsequent time intervals.

In some cases, spiking within the neural network may be sparse and clustered. For a given region, e.g., queue entry, and time interval, there may be only a few spikes directed to different adjacent neurons. For each target neuron, while a different weight may be added, many of the inputs to the neuron may be zero. In accordance with one exemplary embodiment, rather than use execution cycles to process all of the inputs to a given neuron in a set number of cycles, where zeroes require the same amount of time to process as ones, the NN engine may gather inputs by processing only non-zero neuron inputs. By effectively skipping the zero inputs to a neuron, the performance of the NN engine may be improved in terms of runtime and power consumption.

In block 730, the NN engine may determine whether another time interval for the current tile is to be processed. If so, method 700 may loop back to block 720 to process the entries for a next time interval for the current tile. If not, method 700 may continue to block 735.

In block 735, the NN engine may determine whether to execute another tile in the current layer of the neural network. For example, depending upon the partitioning, e.g., number of tiles in the layer, the number of compute units in the NN engine, and/or the size of the internal memory, the NN engine may execute another tile in the current layer. The NN engine may be configured to process spike events for one or more tiles and generate T time intervals worth of output spike events to the next layer before sliding over to another tile of the current layer.

In one aspect, the NN engine may execute each tile in the current layer for one or more time intervals. In another aspect, the NN engine may execute only a subset of tiles, e.g., 1 or more but fewer than all tiles, in the current layer. Still, it should be appreciated that the method of FIG. 7 may be performed by a first compute unit of the NN engine, while one or more other compute units of the NN engine also implement the method of FIG. 7 concurrently. The compute units may also operate in a synchronized manner so that data at the adjacent edges of tiles being processed by the compute units operating concurrently may be shared. Alternatively, tiles may be defined in an overlapping manner to avoid sharing of data between compute units.

In any case, if the NN engine determines that another tile in the current layer is to be executed, method 700 may loop back to block 715 to select a next tile for execution. If the NN engine determines that another tile of the current layer is not to be processed, method 700 may loop back to block 705 to continue processing.

In one arrangement, method 700 may be performed to process a first frustum of the neural network through a first plurality of contiguous layers. Method 700 may iterate to process each other frustum through the first plurality of contiguous layers. Method 700 may then be implemented again to process a first frustum of a second plurality of contiguous layers having a different partitioning than the first plurality of contiguous layers. Method 700 may be repeated to process the remaining frustums through the second plurality of contiguous layers with the different partitioning.

Figure 8:
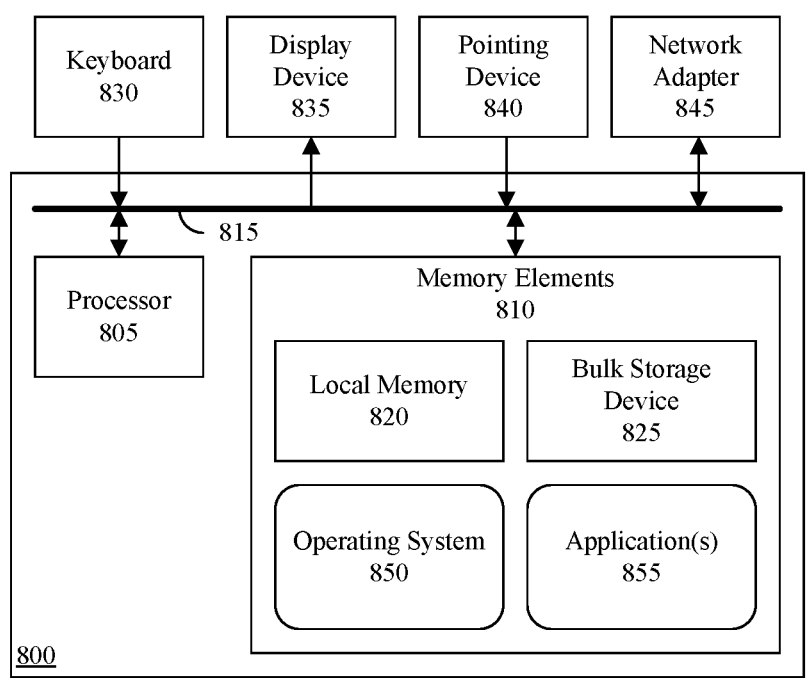
FIG. 8 is a block diagram illustrating an example of a data processing system used to implement a partitioning process on a neural network.

FIG. 8 is a block diagram illustrating an example of a data processing system (system) 800 used to implement a partitioning process as described herein with reference to FIG. 5. As pictured, system 800 includes at least one processor, e.g., a central processing unit (CPU), 805 coupled to memory elements 810 through a system bus 815 or other suitable circuitry. System 800 stores computer readable instructions (also referred to as "program code") within memory elements 810. Memory elements 810 may be considered an example of computer readable storage media. Processor 805 executes the program code accessed from memory elements 810 via system bus 815.

Memory elements 810 may include one or more physical memory devices such as, for example, a local memory 820 and one or more bulk storage devices 825. Local memory 820 refers to random access memory (RAM) or other non-persistent memory device(s) generally used during actual execution of the program code. Bulk storage device 825 may be implemented as a hard disk drive (HDD), solid state drive (SSD), or other persistent data storage device. System 800 may also include one or more cache memories (not shown) that provide temporary storage of at least some program code in order to reduce the number of times program code must be retrieved from bulk storage device 825 during execution.

Input/output (I/O) devices such as a keyboard 830, a display device 835, a pointing device 840, and one or more network adapters 845 may be coupled to system 800. The I/O devices may be coupled to system 800 either directly or through intervening I/O controllers. In some cases, one or more of the I/O devices may be combined as in the case where a touchscreen is used as display device 835. In that case, display device 835 may also implement keyboard 830 and pointing device 840. Network adapter 845 may be used to couple system 800 to other systems, computer systems, remote printers, and/or remote storage devices through intervening private or public networks. Modems, cable modems, Ethernet cards, and wireless transceivers and/or radios are examples of different types of network adapter 845 that may be used with system 800. Depending upon the particular implementation of system 800, the specific type of network adapter, or network adapters as the case may be, will vary.

As pictured in FIG. 8, memory elements 810 may store an operating system 850 and one or more applications 855. Application 855, for example, may be a neural network utility that, when executed, partitions a neural network. In one aspect, operating system 850 and application 855, being implemented in the form of executable program code, are executed by system 800 and, in particular, by processor 805. As such, operating system 850 and application 855 may be considered an integrated part of system 800. Operating system 850, application 855, and any data items used, generated, and/or operated upon by system 800 are functional data structures that impart functionality when utilized by system 800.

In one aspect, system 800 may be a computer or other device that is suitable for storing and/or executing program code. System 800 may represent any of a variety of computer systems and/or devices that include a processor and memory and that are capable of performing the operations described within this disclosure. In some cases, the particular computer system and/or device may include fewer components or more components than described. System 800 may be implemented as a single system as shown or as a plurality of networked or interconnected systems each having an architecture the same as, or similar to, that of system 800.

In one example, system 800 may receive a neural network as an input. System 800, in executing operating system 150 and application 155, may partition the neural network and store the partitioned neural network within a memory or other computer-readable storage medium for later execution.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As used herein, the term "cloud computing" may refer to a computing model that facilitates convenient, on-demand network access to a shared pool of configurable computing resources such as networks, servers, storage, applications, and/or services. These computing resources may be rapidly provisioned and released with minimal management effort or service provider interaction. Cloud computing promotes availability and may be characterized by on-demand self-service, broad network access, resource pooling, rapid elasticity, and measured service. Cloud computing generally supports service models such as Cloud Software as a Service (SaaS), Cloud Platform as a Service (PaaS), and/or Cloud Infrastructure as a Service (IaaS). Cloud computing further may support deployment models such as Private cloud, Community cloud, Public cloud, and/or Hybrid cloud. Further information relating to cloud computing may be obtained from the National Institute of Standards and Technology (NIST) and, more particularly, the Information Technology Laboratory of NIST.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The corresponding structures, materials, acts, and equivalents of all means or step plus function elements that may be found in the claims below are intended to include any structure, material, or act for performing the function in combination with other claimed elements as specifically claimed.

One embodiment may include a method of implementing a spiking neural network having a plurality layers partitioned into a plurality of frustums using a first partitioning, wherein each frustum includes one tile of each partitioned layer of the spiking neural network. The method may include reading a first tile of a first layer of the spiking neural network and generating, using a processor, a first tile of a second layer of the spiking neural network using the first tile of the first layer while storing intermediate data within an internal memory of the processor. The first tile of the first layer and the first tile of the second layer belong to a same frustum.

In one aspect, the first tile of the second layer is generated for a plurality of time intervals prior to generating another tile.

In another aspect, a size of the frustums is determined according to a size of the internal memory.

In a further aspect, the intermediate data includes post synaptic potential values and spike events. Further, the spike events may be stored in an event queue in the internal memory as a plurality of masks with each mask including an x-coordinate and a y-coordinate.

Generating the first tile of the second layer may be performed using a first compute unit of the processor. The method may include generating a second tile of the second layer using a second tile of the first layer of the spiking neural network using a second compute unit of the processor concurrently with the first compute unit.

The method may include generating at least one tile of a further layer of the spiking neural network using a second partitioning different from the first partitioning.

Another embodiment may include an apparatus for implementing a spiking neural network having a plurality of layers partitioned into a plurality of frustums using a first partitioning, wherein each frustum includes one tile of each partitioned layer of the spiking neural network. The apparatus includes an internal memory configured to store intermediate data and a first compute unit coupled to the internal memory and configured to initiate executable operations. The executable operations include reading a first tile of a first layer of the spiking neural network and generating a first tile of a second layer of the spiking neural network using the first tile of the first layer while storing intermediate data within the internal memory. The first tile of the first layer and the first tile of the second layer belong to a same frustum.

In one aspect, the first tile of the second layer is generated for a plurality of time intervals prior to generating another tile.

In another aspect, a size of the frustums is determined according to a size of the internal memory.

In a further aspect, the intermediate data includes post synaptic potential values and spike events. Further, the spike events may be stored in an event queue in the internal memory as a plurality of masks with each mask including an x-coordinate and a y-coordinate.

The apparatus may include a second compute unit configured to initiate executable operations including generating a second tile of the second layer using a second tile of the first layer of the spiking neural network concurrently with the first compute unit.

The first compute unit may be configured to initiate executable operations further including generating at least one tile of a further layer of the spiking neural network using a second partitioning different from the first partitioning.

Another embodiment may include a computer program product including a computer readable storage medium having program code stored thereon to implement a spiking neural network having a plurality of layers partitioned into a plurality of frustums using a first partitioning, wherein each frustum includes one tile of each partitioned layer of the spiking neural network. The program code is executable by the processor to perform operations including reading a first tile of a first layer of the spiking neural network and generating, using a processor, a first tile of a second layer of the spiking neural network using the first tile of the first layer while storing intermediate data within an internal memory of the processor. The first tile of the first layer and the first tile of the second layer belong to a same frustum.

In one aspect, the first tile of the second layer is generated for a plurality of time intervals prior to generating another tile.

In another aspect, a size of the frustums is determined according to a size of the internal memory.

In a further aspect, the intermediate data includes post synaptic potential values and spike events. Further, the spike events may be stored in an event queue in the internal memory as a plurality of masks with each mask including an x-coordinate and a y-coordinate.

The program code may be executable by the processor to perform operations further including generating at least one tile of a further layer of the spiking neural network using a second partitioning different from the first partitioning.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method comprising:
    implementing a spiking neural network having a plurality of layers partitioned into a plurality of frustums using a first partitioning, wherein each frustum comprises a plurality of adjacent layers of the spiking neural network and has a three-dimensional profile having a rectangular intersection and a depth, and wherein each frustum is associated with a respective set of tiles of data of the spiking neural network, wherein an amount of data within each tile is determined by the rectangular intersection of the respective frustum, wherein implementing comprises:
    reading a first tile of a first layer of a frustum; and
    generating, using a processor, a first tile of a second layer of the frustum using the first tile of the first layer while storing intermediate data within an internal memory of the processor.

2. The method of claim 1, wherein the first tile of the second layer is generated for a plurality of time intervals prior to generating another tile.

3. The method of claim 1, wherein a size of a frustum is based, at least in part, upon a size of the internal memory and an amount of data within an input tile, an output tile, and a set of intermediate results associated with the respective frustum.

4. The method of claim 1, wherein the intermediate data comprises post synaptic potential values and spike events.

5. The method of claim 4, wherein the spike events are stored in an event queue in the internal memory as a plurality of masks with each mask including an x-coordinate and a y-coordinate.

6. The method of claim 1, wherein the generating the first tile of the second layer is performed using a first compute unit of the processor, the method further comprising:
    generating a second tile of the second layer using a second tile of the first layer of the spiking neural network using a second compute unit of the processor concurrently with the first compute unit.

7. The method of claim 1, further comprising:
    generating at least one tile of a further layer of the spiking neural network using a second partitioning different from the first partitioning.

8. An apparatus for implementing a spiking neural network having a plurality of layers partitioned into a plurality of frustums using a first partitioning, wherein each frustum comprises a plurality of adjacent layers of the spiking neural network and has a three-dimensional profile having a rectangular intersection and a depth, and wherein each frustum is associated with at least one respective tile of each partitioned layer, the apparatus comprising:
    an internal memory configured to store intermediate data;
    a first compute unit coupled to the internal memory and configured to initiate executable operations including:
    reading a first tile of a first layer of a frustum; and
    generating a first tile of a second layer of the frustum using the first tile of the first layer while storing intermediate data within the internal memory.

9. The apparatus of claim 8, wherein the first tile of the second layer is generated for a plurality of time intervals prior to generating another tile.

10. The apparatus of claim 8, wherein a size of a frustum is based, at least in part, upon a size of the internal memory and an amount of data within an input tile, an output tile, and a set of intermediate results associated with the respective frustum.

11. The apparatus of claim 8, wherein the intermediate data comprises post synaptic potential values and spike events.

12. The apparatus of claim 11, wherein the spike events are stored in an event queue in the internal memory as a plurality of masks with each mask including an x-coordinate and a y-coordinate.

13. The apparatus of claim 8, further comprising:
    a second compute unit configured to initiate executable operations including:
    generating a second tile of the second layer using a second tile of the first layer of the spiking neural network concurrently with the first compute unit.

14. The apparatus of claim 8, wherein the first compute unit is configured to initiate executable operations further comprising:
    generating at least one tile of a further layer of the spiking neural network using a second partitioning different from the first partitioning.

15. A computer program product comprising a computer readable storage medium having program code stored thereon to implement a spiking neural network having a plurality of layers partitioned into a plurality of frustums using a first partitioning, wherein each frustum comprises a plurality of adjacent layers of the spiking neural network and has a three-dimensional profile having a rectangular intersection and a depth, and wherein each frustum is associated with a respective set of tiles of data of the spiking neural network, wherein an amount of data within each tile is determined by the rectangular intersection of the respective frustum, the program code executable by the processor to perform operations comprising:
    reading a first tile of a first layer of the spiking neural network; and
    generating, using a processor, a first tile of a second layer of the spiking neural network using the first tile of the first layer while storing intermediate data within an internal memory of the processor; the first tile of the first layer and the first tile of the second layer belonging to a same frustum.

16. The computer program product of claim 15, wherein the first tile of the second layer is generated for a plurality of time intervals prior to generating another tile.

17. The computer program product 15, wherein a size of a frustum is based, at least in part, upon a size of the internal memory and an amount of data within an input tile, an output tile, and a set of intermediate results associated with the respective frustum.

18. The computer program product 15, wherein the intermediate data comprises post synaptic potential values and spike events.

19. The computer program product of claim 18, wherein the spike events are stored in an event queue in the internal memory as a plurality of masks with each mask including an x-coordinate and a y-coordinate.

20. The computer program product of claim 15, wherein the program code is executable by the processor to perform operations further comprising:
    generating at least one tile of a further layer of the spiking neural network using a second partitioning different from the first partitioning.

\* \* \* \* \*